United States Patent Office 2,955,184
Patented Oct. 4, 1960

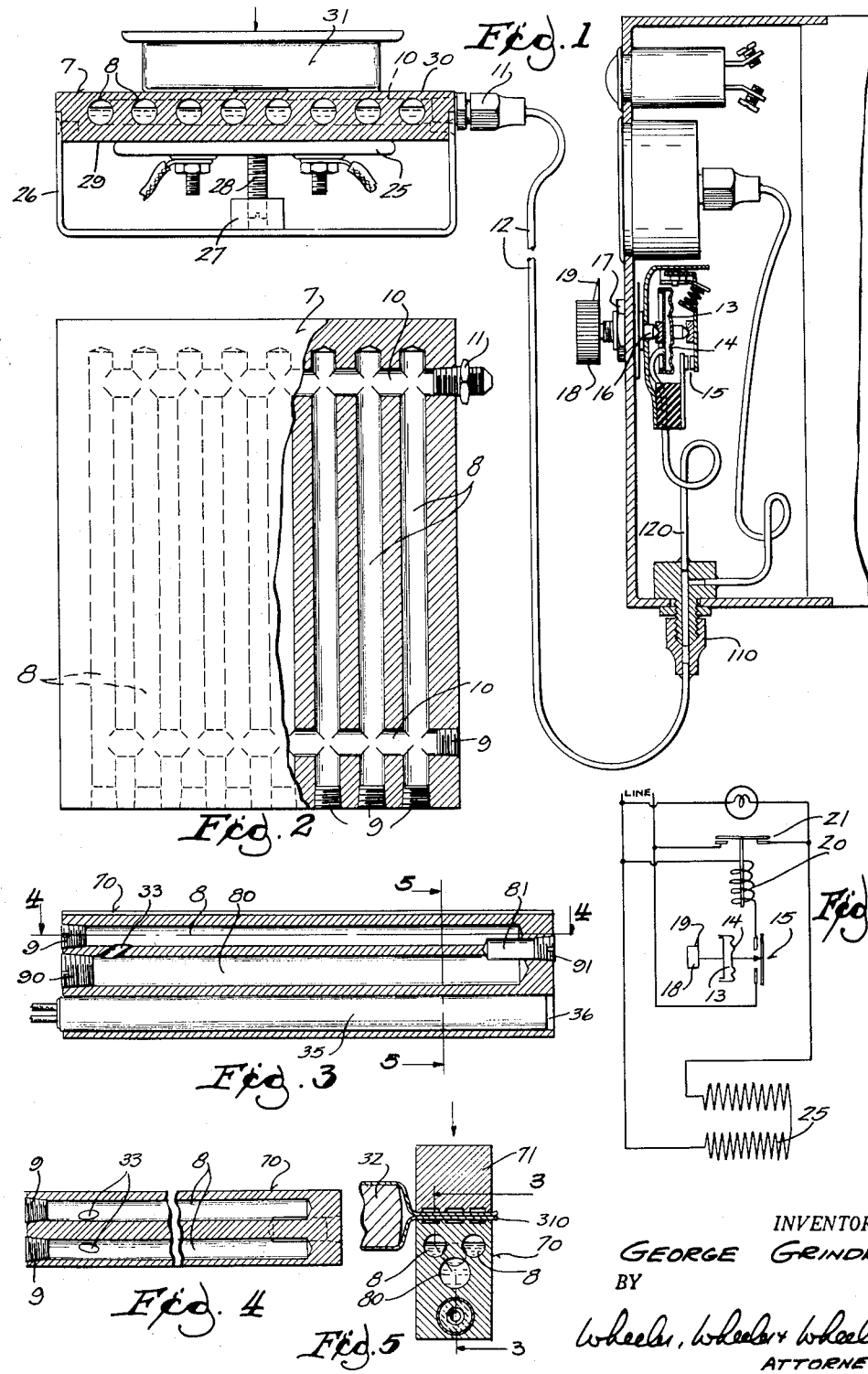

2,955,184

APPARATUS FOR PRECISION CONTROL OF THE SURFACE TEMPERATURE OF METALLIC HEATERS

George E. Grindrod, 433 W. Wisconsin, Ave., Oconomowoc, Wis.

Filed Feb. 27, 1957, Ser. No. 642,763

6 Claims. (Cl. 219—19)

This invention is a method and apparatus for precision control of the surface temperature of metallic heaters. The principal use contemplated for the invention is in the heat sealing of packages enclosed in plastic sheet or web, where conventional thermostatic controls have been found too slow in response. The method overcomes the difficulty commonly experienced in securing uniform temperature over the entire surface of heat sealing bars.

The method provides for the use of conventional electrical resistance heating elements, but provides a novel method of controlling and rendering uniform the heat at the active surface of the bar, even when the bar derives its heat from a localized source.

The basic structure is a bar of any desired size or shape as may be required for the packages to be sealed. The bar, made of copper for example, has an internal passage or grid of passages which parallel the active surface and are proximate thereto. The ends of the communicating passages are plugged securely, making, in effect, a hollow bar with internal reinforcement adequate to retain rigidity of the bar and maintain the active surface true. The interior of the bar contains one or more vaporizable liquids and the vapor of the liquid or liquids. All air is evacuated.

Leading from the cavity is a tube, such as a small bore copper tube, connected to a pressure sensitive control instrument. One side of the bar, which is to be used as the contact surface for sealing packages, is plane and polished. An electrical heating element or the like is used to heat the bar, usually being in external contact with a portion of the bar remote from that which provides the contact surface. Desirably the interface between the liquid and its vapor intervenes between the heat source and the active face of the bar from which heat is withdrawn for use. The pressure sensitive control instrument is connected to regulate the current to the heating element, whereby an increase in vapor pressure developed within the plate in consequence of temperature increase, cuts off the current and a reduction in temperature and vapor pressure closes the circuit to the heating element.

In the drawings:

Fig. 1 is a view in transverse cross section through a bar embodying the invention, a work piece and electrical heating element being shown in end elevation and the bar being connected to a control instrument which is illustrated partly in section and partly in side elevation.

Fig. 2 is a view of the bar in plan, a portion thereof being broken away to a horizontal section.

Fig. 3 is a view in cross section of a pair of sealing jaws, one of which is a bar embodying the invention, the section being taken on the line 3—3 of Fig. 5.

Fig. 4 is a view taken in section on the line 4—4 of Fig. 3.

Fig. 5 is a view taken in section on line 5—5 of Fig. 3.

Fig. 6 is a diagram of the electrical circuits.

The heating element is hereinafter referred to generically as a bar even though specifically the embodiment shown in Fig. 1 and Fig. 2 is so broad that it may be characterized as a plate. The plate 7 is provided with a plurality of closely spaced blind bores 8, all of which are closed by plugs 9 at the ends where the drill enters. These are intersected by one or more cross bores 10, all but one of which are also closed by plugs 9. Union 11 is screwed into the one remaining bore 10 to provide communication through tube 12 with chamber 13, which has a sensitively flexible wall 14 engaging the movable contact of switch 15. The pressure responsive wafer comprising chamber 13 and its flexible wall 14 is mounted for adjustment on the point of screw 16 which is threaded into fixed nut 17 and carries knob 18 provided with pointer 19. As shown in Fig. 6, switch 15 is connected in series between a current source and the coil 20 of a relay 21. When switch 15 is closed, the relay switch 21 closes to energize the heating element 25, which is disposed in or against the bar 7.

In the construction shown in Fig. 1, a housing 26 is screwed to the back side of the bar 7 and carries a nut 27 through which clamp screw 28 is threaded to engage the heating element 25 and to force this into pressure contact with the back surface 29 of the bar.

As already indicated the bar is desirably made of copper or other high conductive and non-porous metal, capable of having its operating face 30 highly polished. In order to use it for heat sealing purposes, the heat-sealable wrapper of the work piece 31 shown in Fig. 1 is engaged under pressure with the polished surface 30 of bar 7 until the desired seal is effected. The arrangement shown is such that notwithstanding any thermal demand made upon the bar (within the capacity of the apparatus) the surface of the bar is uniformly maintained at a substantially constant temperature ($\pm 1°$ F.), because of the fact that its interior cavities or passages are only partially filled with the vaporizable liquid or liquids, the remaining portions of such cavities being filled with the vapor of the liquid or liquids, and all air being excluded.

In the embodiment shown in Figs. 3 to 5, the bar 70 is a relatively narrow bar comprising the lower jaw of a heat sealing device with which the upper jaw 71 coacts. The heat sealable material 310 comprising a wrapper for the work piece 32 has its margins engaged between the jaws 70 and 71 for a period sufficient to effect the seal. Due to the narrowness of the bar 70, it comprises but two of the bores or passages 8 and these are placed in communication with an underlying bore 80. This may be done by drilling ducts 33 as shown in Fig. 3 from the bore 80 into each passage 8 before the bore 8 and passage 80 are closed by the plugs 9 and 90, respectively. Alternatively, it may be done by drilling parallel to the bores 8 and 80 a further bore 81 of sufficient diameter to intersect all of the other bores as shown in Fig. 3, this further bore then being closed by plug 91.

The heating element 35 ordinarily comprises a bar type heater fitting in the bores 36 of bar 70. The pressure system and electrical hook-up may be identical with that disclosed in connection with elements of Fig. 1, Fig. 2 and Fig. 6.

The system is prepared for use as follows:

The bar 7 and the tube 12 leading to the control instruments are disconnected at union 11. Tube 12 and the pressure capsule 13, 14, are then connected to a source of high vacuum and evacuated totally, or to the highest degree obtainable. While under vacuum, tube 12 and the interior of the pressure sensitive capsules are filled with a stable liquid such as a light oil. A silicon oil is ideal but any non-miscible liquid with the liquid and vapor in the bar is appropriate. Atmospheric pressure will force into the tube and instrument some oil from a batch in which the free end of the tube is immersed, leaving all portions of the system completely filled with the oil, there being no remaining gas space.

The cavity in the bar is now similarly evacuated to the highest possible degree and filled with air-free water or other appropriate liquid. On completion of this fill, the bar is heated until it expels a measured volume of water known to equal about one-third of the total volume of the interior capacity of the bar. Before the bar is cool, and with water still exposed at the union 11, the union is joined with care to avoid any air entrapment, the water being in direct contact with the light oil above described.

Alternately, the tube may be separated at the union 110 from the instrument and only those portions 120 of the tube which lie within the instrument may be filled with oil, all the remainder of the tube 12 being filled with water, and the water-oil contact being established at union 110. In either case, the entire system is now entirely full of liquid except for the vapor space above the level of the water within the bar, no condensable gas remaining in the system.

While reference has been made to water, it will be understood that any other vaporable liquid, desirably of high specific heat and desirably nonmiscible with the oil may be substituted.

The pressure in the entire system will now be uniform throughout and that pressure must invariably be the vapor pressure of the water or other liquid in the bar, at whatever temperature the bar may have.

It will be observed that the position of the bar is desirably approximately horizontal as shown, assuming that the connection between the interior passages is effected as shown. In other words, it is desirable that such water or other vaporizable liquid as is trapped within the bar, will be distributed throughout the interior passages thereof and will be so disposed that the water vapor in the passages will be close to the sealing surface 30 of the bar 7 or the corresponding jaw surface of the jaw 70 of Figs. 3 to 5.

Since the water vapor is next to the sealing surface, and the metal of the bar is highly conductive, the temperature of the vapor and the temperature of the surface will be identical.

In an air-free system having a water to water-vapor interface, all of the vapor is necessarily at the same temperature and pressure. If heat is added or withdrawn at any one spot, the entire system readjusts its pressure and consequently its temperature instantaneously. If any part of the surface of the bar loses heat, all of the surface has to lose such amount to establish equilibrium. Any change in total heat contained in the system effects instantaneous and corresponding change in pressure. Changes in pressure are detected instantaneously without time lag. A bar having an internal water to water vapor system cannot be spot cooled or spot heated.

When electric heat is applied to the bar by means of a resistor clamped to the back of the bar, the application of heat is necessarily localized. However, since the water and water vapor interface intervenes between the point of application of the heat and the point of use, the heat is inherently uniformly distributed at the working surfaces. Water is ideal for use in the bar. Its specific heat is high and its latent heat and the transmission rate between the water vapor and the air-free metallic surface is exceptionally high.

It will be understood that the specific diaphragm type of pressure responsive wafer is not a part of the present invention, nor is it essential to use this type of pressure responsive device. The relay is not essential to the use of the system except that, in practice, I find it desirable that a current controlled by a diaphragm contact should be at the lowest practicable amperage. I use a current of about 50 milliamperes to control the relay.

In the heat sealing of commercially available plastic materials, a temperature fluctuation of plus or minus 1° F. is sufficiently precise for maintaining the desired control of the heat sealing temperature, provided there is not spot cooling or spot heating in excess of this change of plus or minus 1° F. Thus a bar having an interior cavity free of air in which a liquid and its vapor are confined, with the vapor desirably proximate the face of the bar from which the heat is delivered provides the necessary uniformity of distribution and makes it practicable to keep the temperature within 1° F. of that for which the control is set. While the bar is illustrated in a position in which the heat delivery face is horizontal, it may be used in other positions as long as a substantial part of the interior metal surface of the bar contiguous to the heat delivery face is exposed to the vapor.

A variation of 1° F. will actuate electrical contacts in the apparatus disclosed. The response is faster than can be detected by any conventional thermometer within a period of several seconds and is even faster than the usual response of a thermocouple.

I claim:

1. In a device of the character described, a heat conductive bar having a heat receiving surface and an operating surface for the transmission of heat to a work piece, heat generating means for delivering heat to the receiving surface of said bar, said bar having an interior cavity intervening between said surfaces and in proximity to said operating surfaces and substantially free of non-condensable gases, and fluid in said cavity comprising a liquid and the vapor of said liquid, the operating surface being exposed only to the vapor and the said vapor comprising means for an instant distribution of heat uniformly to said operating surface to compensate for heat withdrawals therefrom, means for the control of heat delivery to said bar and pressure sensitive means connected to said cavity and responsive to vapor pressure therein for determining the operation of said control means, said cavity and pressure sensitive means being sealed against leakage.

2. In a device of the character described, the combination with a heating bar having a heat exchange face and an interior cavity proximate to said face, of a vaporizable fluid in said cavity and comprising both liquid and the vapor of said liquid, said cavity being substantially devoid of fixed gas and the vapor being exposed to the portion of said bar between said cavity and said face, and means for delivering heat directly to said bar at the opposite side of said cavity from said face, a tube communicating with said cavity below the surface of the liquid therein and filled with liquid, and a pressure responsive instrument also filled with liquid and with which said tube communicates, the liquid in the instrument comprising a stable oil nonmiscible with the liquid in the bar cavity, said oil and liquid last mentioned providing a substantially continuous air-free column for transmitting pressure from the said cavity to said instrument, and means connected with said instrument and with said heating means for regulating the heat delivery to the bar inversely to the vapor pressure in the cavity of said bar.

3. The device of claim 2 in which the fluid in the cavity of said bar comprises water, liquid and vapor, the instrument and at least a major portion of the tube communicating with said cavity and with said instrument containing a very light oil.

4. The combination with a heating bar comprising metal of high thermal conductivity and having a heat delivering face, of an electrical heating element in direct heat delivering relation to a portion of said bar remote from said face, said bar being provided between said face and said heating element with a plurality of communicating passages substantially free of air and containing a vaporizable liquid and the vapor of said liquid, the metal of the bar between said passages and said face being principally exposed to said vapor, and the heated portion of the bar being principally exposed to said liquid, a tube filled with liquid and communicating with the liquid in the passage of said bar, a pressure responsive instrument filled with liquid and communicating with said tube, the said instrument and tube being substantially free of air and at least the liquid in the instrument comprising a stable oil nonmiscible with the liquid in the bar and having a substantially air-free interface therewith, a switch controlling the heating element, and means for communicating motion from the instrument to the switch for the operation of the switch to deenergize said element upon the rise of vapor pressure within the bar and to energize the heating element upon the fall of vapor pressure.

5. The device of claim 4 in which the bar comprises a heat sealing jaw.

6. The device of claim 4 in which said bar comprises a broad plate, said face being upwardly exposed and said passages comprising a plurality of bores having closures at their ends and at least one transverse bore placing the bores first mentioned in communication with each other.

References Cited in the file of this patent

UNITED STATES PATENTS

| | | |
|---|---|---|
| 1,381,282 | Clark | June 14, 1921 |
| 1,921,432 | Stallard | Aug. 8, 1933 |
| 1,994,740 | Young et al. | Mar. 19, 1935 |
| 2,032,294 | McDonald | Feb. 25, 1936 |
| 2,396,578 | Kittel et al. | Mar. 12, 1946 |
| 2,478,569 | Cooper | Aug. 9, 1949 |
| 2,567,056 | Coumerilh et al. | Sept. 4, 1951 |
| 2,743,347 | Porter | Apr. 24, 1956 |
| 2,762,895 | Throw | Sept. 11, 1956 |
| 2,766,809 | Parham | Oct. 16, 1956 |
| 2,820,134 | Kobayashi | Jan. 14, 1958 |

UNITED STATES PATENT OFFICE
CERTIFICATE OF CORRECTION

Patent No. 2,955,184                 October 4, 1960

George E. Grindrod

It is hereby certified that error appears in the printed specification of the above numbered patent requiring correction and that the said Letters Patent should read as corrected below.

Column 4, line 25, for "surfaces" read -- surface --.

Signed and sealed this 11th day of April 1961.

(SEAL)
Attest:
ERNEST W. SWIDER
Attesting Officer

ARTHUR W. CROCKER
Acting Commissioner of Patents